United States Patent
Marles (10) Patent No.: US 12,459,670 B2
(45) Date of Patent: Nov. 4, 2025

(54) SENSOR DEVICE AND METHOD FOR SENSING GAS FOR AIRCRAFT SHOCK-ABSORBER

(71) Applicant: AIRBUS OPERATIONS LIMITED, Bristol (GB)

(72) Inventor: David Marles, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 279 days.

(21) Appl. No.: 18/121,288

(22) Filed: Mar. 14, 2023

(65) Prior Publication Data
US 2023/0294843 A1 Sep. 21, 2023

(30) Foreign Application Priority Data
Mar. 15, 2022 (GB) ...................... 2203596

(51) Int. Cl.
*B64F 5/60* (2017.01)
*B64C 25/60* (2006.01)
*B64F 5/40* (2017.01)

(52) U.S. Cl.
CPC ................ *B64F 5/60* (2017.01); *B64C 25/60* (2013.01); *B64F 5/40* (2017.01)

(58) Field of Classification Search
CPC ..................................... B64F 5/40; B64F 5/60
See application file for complete search history.

(56) References Cited

U.S. PATENT DOCUMENTS

| | | | |
|---|---|---|---|
| 3,889,904 A * | 6/1975 | Jones | B64F 5/60 141/49 |
| 6,424,891 B1 * | 7/2002 | Sargent | B64F 1/364 701/33.2 |
| 8,565,965 B2 | 10/2013 | Nance | |
| 10,232,958 B2 | 3/2019 | Pountney et al. | |
| 11,254,448 B2 | 2/2022 | Pountney et al. | |
| 11,254,449 B2 | 2/2022 | Pountney et al. | |
| 2004/0129834 A1 * | 7/2004 | Luce | F16F 9/3264 244/100 R |

(Continued)

FOREIGN PATENT DOCUMENTS

| | | |
|---|---|---|
| EP | 2 921 404 | 9/2015 |
| EP | 3 299 792 | 3/2018 |

(Continued)

OTHER PUBLICATIONS

Combined Search and Exam Report for GB2203596.8, dated Aug. 1, 2022, 7 pages.

(Continued)

*Primary Examiner* — Eric S. McCall
(74) *Attorney, Agent, or Firm* — Nixon & Vanderhye P.C.

(57) ABSTRACT

A sensor and method for sensing gas absorbed in hydraulic fluid in an aircraft shock absorber are disclosed. The hydraulic fluid and a gas are in fluid communication with each other. The sensor may be incorporated in the shock absorber or in servicing apparatus such as a servicing cart. The amount of gas absorbed in the hydraulic fluid is provided as a parameter which in combination with other parameters allows a user an improved means to determine the maintenance state of the shock absorber and to derive servicing actions.

21 Claims, 8 Drawing Sheets

(56) References Cited

U.S. PATENT DOCUMENTS

| | | | |
|---|---|---|---|
| 2007/0069072 A1* | 3/2007 | Luce | B64C 25/60 244/104 FP |
| 2010/0017052 A1* | 1/2010 | Luce | B64C 25/60 356/73.1 |
| 2010/0161174 A1* | 6/2010 | Yates | G01G 19/07 701/16 |
| 2011/0214601 A1* | 9/2011 | Martin | B64D 45/00 116/203 |
| 2014/0046533 A1* | 2/2014 | Nance | B64F 5/60 701/33.7 |
| 2014/0245813 A1 | 9/2014 | Baltz et al. | |
| 2015/0269794 A1 | 9/2015 | Fazeli et al. | |
| 2016/0101877 A1 | 4/2016 | Shepherd et al. | |
| 2017/0008647 A1* | 1/2017 | Pountney | G01M 17/007 |
| 2017/0008648 A1 | 1/2017 | Pountney et al. | |
| 2020/0249129 A1 | 8/2020 | Fazeli et al. | |
| 2020/0324920 A1 | 10/2020 | Fazeli et al. | |

FOREIGN PATENT DOCUMENTS

| | | |
|---|---|---|
| EP | 3 118 111 B1 | 4/2021 |
| EP | 3 404 564 B1 | 9/2021 |
| GB | 2541160 | 2/2017 |
| GB | 2541161 | 2/2017 |
| GB | 2569768 | 7/2019 |
| WO | 2022/087717 | 5/2022 |

OTHER PUBLICATIONS

Technical Data, "Total Dissolved Gas (TDG) Sensor", Mar. 31, 2020, one page.
Extended European Search Report for Application No. 23160020.6, 10 pages, dated Jul. 13, 2023.

* cited by examiner

SENSOR DEVICE AND METHOD FOR SENSING GAS FOR AIRCRAFT SHOCK-ABSORBER

CROSS RELATED APPLICATION

This application claims priority to United Kingdom Patent Application GB 2203596.8, filed Mar. 15, 2022, the entire contents of which is hereby incorporated by reference.

BACKGROUND OF THE INVENTION

The present invention concerns sensors and methods for determining the maintenance state of aircraft shock-absorbers.

More particularly, but not exclusively, this invention concerns a sensor device and method for determining one or more parameters of the state of an aircraft shock absorber on a landing gear assembly of an aircraft, including apparatus for servicing such a shock absorber.

Figure 1:
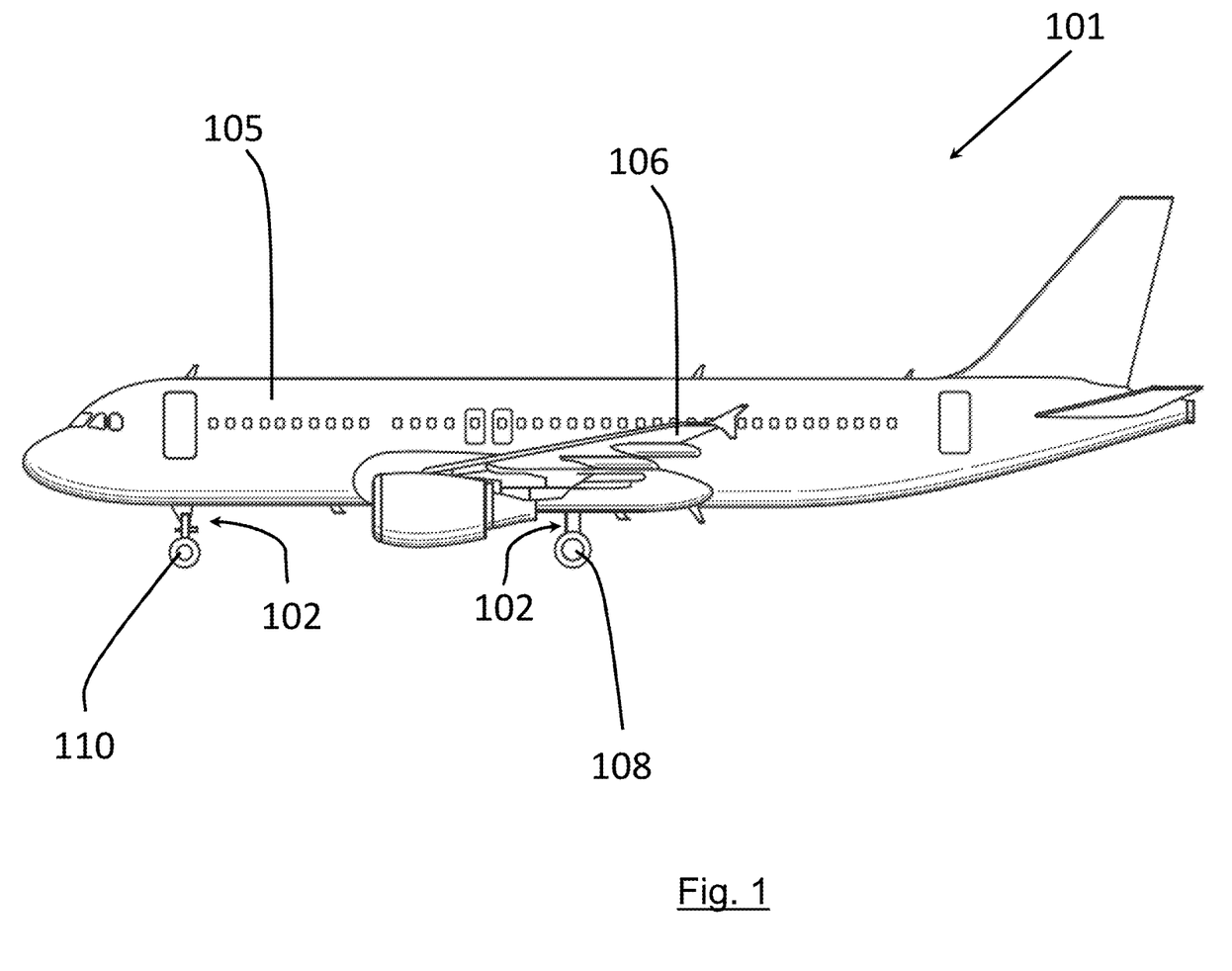
FIG. 1 shows an aircraft of a type that may incorporate the first embodiment of the invention, and which may be serviced by apparatus according to a second embodiment of the invention.
Figure 2:
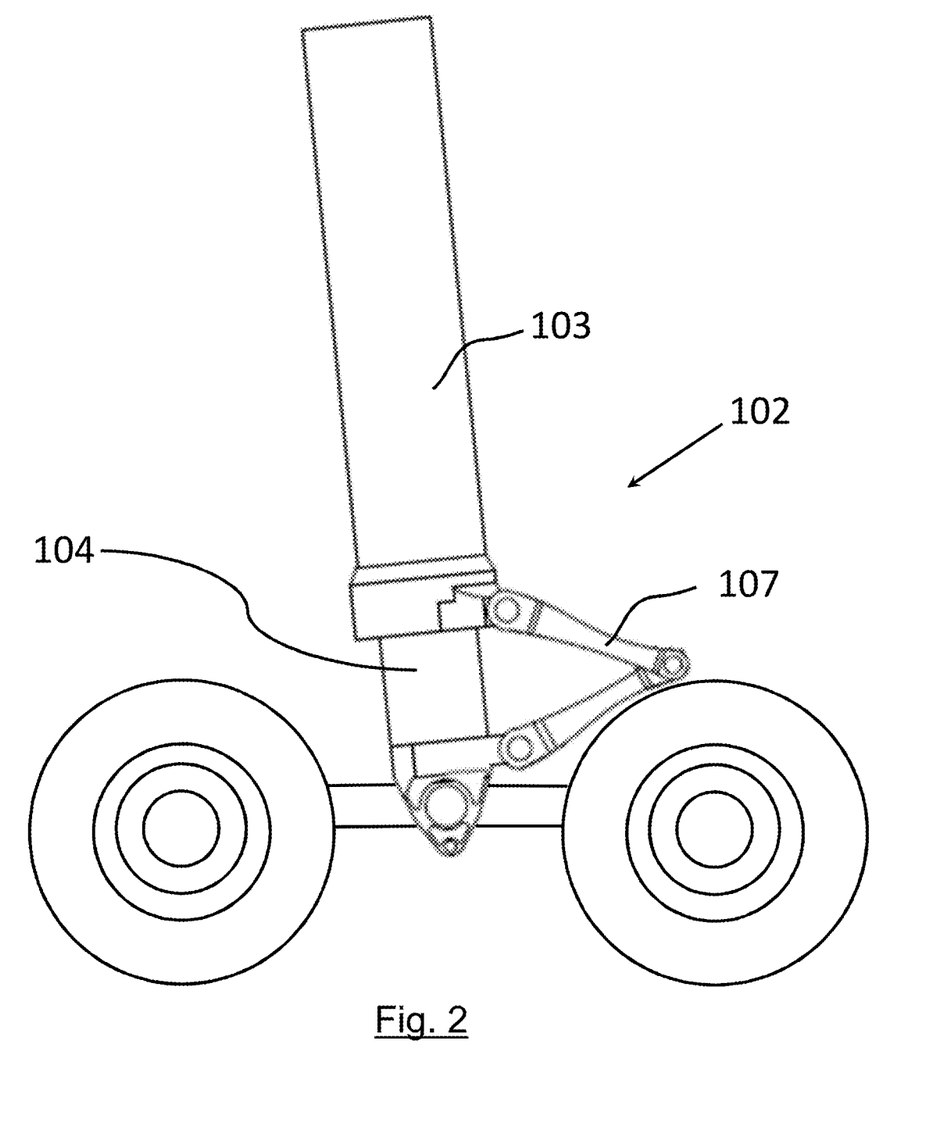
FIG. 2 shows a shock absorber of the aircraft of FIG. 1.

Conventional aircraft shock-absorbers provide a means of energy absorption during landing and also a defined taxi ride height for the aircraft. There are also other considerations such as passenger ride comfort during taxi. Many different designs of shock absorber exist, but most modern commercial aircraft have an unseparated oil and gas mixture in fluid contact with one another, commonly referred to as oleo-pneumatic. The oil (typically hydraulic fluid) provides a damping action primarily to aid energy absorption on landings, and the gas (typically Nitrogen) provides a suspension (spring) action. FIG. 1 shows an aircraft 101, with shock absorbers 102 supporting the aircraft 101 on main landing gear 108 and nose landing gear 110. FIG. 2 shows a simplified representation of an unseparated oleo pneumatic shock absorber 102, comprising a sliding piston 104 which moves telescopically within a cylinder 103, and which includes a torque link 107.

Figure 3:
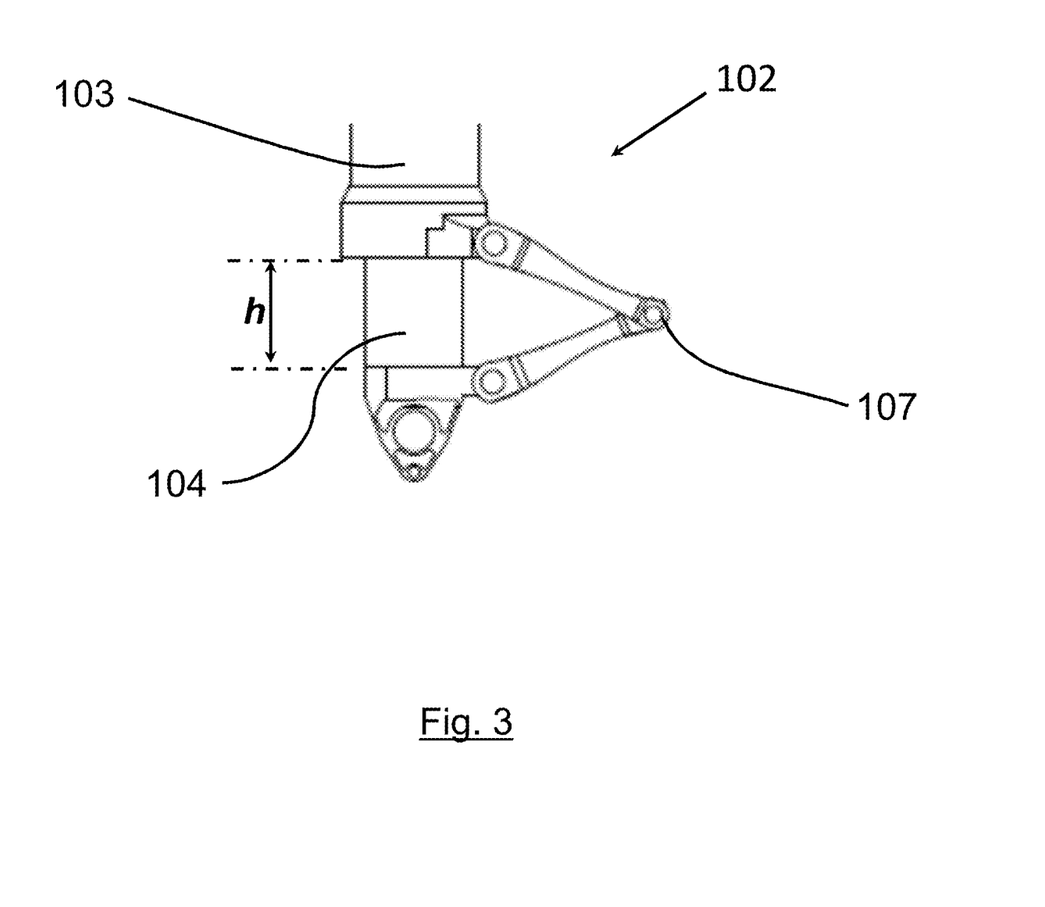
FIG. 3 shows part of the shock absorber of FIG. 2 illustrating the measuring of an H-dimension.

The amount of gas in the shock absorber is nominally determined by measuring the extension of the shock absorber 102 relative to a reference point (often referred to as the 'H-dimension') with the weight of the aircraft being supported by the landing gear assemblies of the aircraft 101. FIG. 3 shows an H-dimension (labelled as "h") of the shock absorber 102 of FIG. 2, as being measured between the bottom of the sliding piston 104 and the top of the attachment lug of the lower torque link 107 of the shock absorber 102. For a given ambient temperature, and with known aircraft weight and centre-of-gravity parameters, a look-up chart is used to assess whether the H-dimension indicates that there is an appropriate amount of gas in the shock absorber. While the servicing should only need to happen at set maintenance intervals, regular inspection of the landing gear may flag the need for interim intervention. Typically a check on the shock absorber H-dimension is the only means to assess whether the shock absorber needs a maintenance action.

According to a typical servicing procedure, temperature, the gas pressure and the H-dimension of the shock absorber are measured; if, for a given gas pressure, the H-dimension is different from an expected value (e.g. below a defined limit), then a maintenance action takes place.

It is often assumed that a reduction in the H-dimension is the result of leakage of gas alone from the shock absorber. However there are other reasons why the H-dimension might be lower than desired. One example is the loss of hydraulic fluid, and another is from a phenomenon called Nitrogen absorption, where due to the Nitrogen and hydraulic fluid being co-located within the absorber chamber, some Nitrogen may be absorbed within the hydraulic fluid. Nitrogen may also be held within hydraulic fluid as gas bubbles.

Pressure and/or temperature may affect the amount of nitrogen held (whether the Nitrogen is absorbed and/or held in the fluid as a mixture). Other factors may also have an effect on how much Nitrogen is in the fluid. For example, the geometry and surface area at the boundary between liquid and gas may have an impact. Dynamic effects may also have an impact.

Depending on the level of agitation between the hydraulic fluid and Nitrogen mixture, different amounts of Nitrogen may be absorbed into the fluid (i.e. the number of moles of Nitrogen in the gas phase that are absorbed into the fluid), changing the spring properties of the shock absorber which affects the aircraft ride height. Consequently measuring the H-dimension of the shock absorber can be misleading, resulting in unnecessary servicing of the landing gear or the servicing of the landing gear being based on an incomplete overview of the state of the shock absorber, which could in turn mean that the servicing is not as accurate as it could otherwise be. In addition, changes to the spring properties of the shock absorber due to Nitrogen absorption can affect the loads being transferred into the airframe during landing and/or taxi.

GB 2541161A describes a method and apparatus for servicing an oleo-pneumatic shock absorber in a weight-on-wheels state in which Nitrogen absorption may be present within the hydraulic fluid in the shock absorber chamber. The method includes exhausting the Nitrogen from the chamber, degassing the absorbed gas from the hydraulic fluid, replenishing the correct amount of hydraulic fluid in the chamber, and then administering a pre-set mass of gas into the chamber. One disadvantage of this method is the time taken to execute all of the above steps.

The present invention seeks to mitigate one or more of the above-mentioned disadvantages. Alternatively or additionally, the present invention seeks to provide an improved sensor and method for determining the state of an aircraft shock absorber.

SUMMARY OF THE INVENTION

According to a first aspect of the present invention there is provided a sensor device for determining at least one parameter at an aircraft shock absorber, the aircraft shock absorber having at least one chamber containing both hydraulic fluid and a gas in fluid communication with each other, an amount of the gas being absorbed in the hydraulic fluid. The sensor device is arranged to measure (preferably directly) the amount of gas in the hydraulic fluid in order to determine the at least one parameter. The sensor device is preferably arranged to measure the amount (e.g. as a proportion or concentration, whether by volume or by mass) of the gas in the hydraulic fluid at a particular region or of a particular sample (e.g. such a measurement being of a sub-set/part-only of the entire volume of the hydraulic fluid within the shock absorber, and/or chamber thereof). It is preferred for (at least part of) the sensor device to be in direct contact with the hydraulic fluid so that, for example, the local proportion/concentration of gas in the region of hydraulic fluid in contact with the sensor device is measured (and preferably measuring only the local proportion/concentration of gas). For example, it may be that the sensor device, when in contact with the hydraulic fluid (i.e. at least part of the device is in contact with at least some of the hydraulic fluid), makes a measurement (for example measuring a gas absorption level) which depends on the amount of the gas absorbed in the hydraulic fluid. The sensor device may alternatively, or additionally, make a measurement which depends on the amount of the gas in the hydraulic fluid, whether absorbed or held in gaseous form. It will be understood that such a sensor device may in such a case effectively be measuring an absorption level of the amount of the gas absorbed in the hydraulic fluid.

In example embodiments utilising such a sensor device when assessing the state of the aircraft shock absorber, the state of the shock absorber may be more accurately determined, as the level of the Nitrogen gas within the hydraulic fluid affects other parameters that are typically measured, such as the H-dimension value. Taking the Nitrogen absorption level (for example, as measured directly) into account may prevent unnecessary servicing of the landing gear or facilitate a faster and more efficient servicing of the landing gear than would otherwise be possible.

The sensor device may be arranged to measure only the amount of gas in the fluid. It may be used, along with other sensors, to provide data regarding other physical properties associated with the aircraft shock absorber, or the gas or fluid therein. Embodiments of the invention may include making (with such other sensors for example) measurements of, or otherwise taking into account inferred values concerning, parameters such as pressure, volume and temperature from which the amount of gas absorbed or otherwise held in the fluid could be estimated/calculated. However, in such embodiments, the use of a directly measured value of the amount of the gas in the hydraulic fluid provides extra data that can then provide a more accurate model/representation of the state of the shock absorber gas-fluid system.

The sensor device may be further arranged to measure the pressure of the at least one chamber; the least one parameter including a pressure parameter. The sensor device may comprise multiple sensors, for example each comprising different sensors for measuring different physical properties. Such sensors may be provided separately (e.g. not within the same single housing) but may be integrated with one or more common aspects of the overall sensor device. For example, the sensor device may comprise a single control unit or communications interface that links to each of two or more sensors. The sensor device (or at least a sensing part of the device) may be mounted within the at least one chamber of the shock absorber. The majority of the mass of the sensor device may be carried by the shock absorber. The sensor device may be monitored by at least one system of an aircraft to which the shock absorber is attached. In certain embodiments, it may be that the sensor device is arranged to provide measurements of the amount of gas in the hydraulic fluid at times other than take-off, landing and when on the ground. For example, measurements may be taken periodically during flight thus enabling better understanding of the state of the shock absorber, and how nitrogen absorption can vary during a flight, from before take-off to after landing.

The sensor device may be arranged to measure a pressure in a part of the shock absorber and/or the sensor device may be arranged to be used alongside a separate pressure sensor. Such a pressure measurement may be a measure of a pressure of the gas and/or a measure of a pressure of the hydraulic fluid. It may be that in equilibrium the pressure of the gas is equal to the pressure of the hydraulic fluid in the shock absorber.

In another example embodiment, the sensor device is mounted within a first sampling chamber of a servicing apparatus operably connected to at least one port of the shock absorber. For example, it may be that the servicing apparatus is arranged to receive a sample of the hydraulic fluid from the shock absorber into the first sampling chamber via the at least one port in order to determine the at least one parameter. The at least one port of the shock absorber may include a hydraulic fluid port.

In an embodiment of the present invention, the shock absorber includes a gas port. In such a case, the servicing apparatus may further include a second sampling chamber operably connected to the gas port. In such a case, it may be that the at least one parameter includes a pressure parameter and the servicing apparatus is further arranged to receive a sample of the gas from the shock absorber into the second sampling chamber via the gas port in order to determine the pressure parameter. Such a pressure parameter could alternatively/additionally be measured via a hydraulic fluid port.

The servicing apparatus may optionally be an aircraft landing gear servicing cart. Such a servicing cart may for example comprise a source of Nitrogen gas. Such a servicing cart may for example comprise a source of hydraulic fluid. Such a servicing cart may for example comprise one or more pumps and/or flow devices (e.g. valves) in order to control the flow of gas and/or fluid between the cart and the shock absorber.

According to a second aspect of the present invention there is provided a method of determining at least one parameter at an aircraft shock absorber, the aircraft shock absorber containing both hydraulic fluid and a gas in fluid communication with each other, an amount of the gas being absorbed in the hydraulic fluid. The method includes a step of directly measuring the level of gas in the fluid (e.g. measuring an absorption level of the amount of gas absorbed in the hydraulic fluid). There may be a step of indicating the level of gas in the fluid (e.g. the absorption level). There may be a step of supplying a signal (e.g. the signal suppling data) representing the level of gas in the fluid (e.g. the absorption level). The method includes a step of using (e.g. deriving from) the measured absorption level to provide the at least one parameter.

In a further embodiment, the at least one parameter comprises a pressure parameter, for example gas pressure. The method may further comprise a step of measuring a pressure in the shock absorber, for example of the gas (e.g. in order to derive or otherwise provide a pressure parameter). In this way, it may be that the at least one parameter provides an indication of a maintenance state of the shock absorber. Such an indication of the maintenance state of the shock absorber may further be used to derive maintenance actions for servicing the aircraft shock absorber.

The determining of the at least one parameter may include measuring (including inferring from other measurements) the temperature at the aircraft shock absorber (for example the temperature of the fluid and/or the gas in the aircraft shock absorber—which should of course be the same when in equilibrium). The determining of the at least one parameter may include measuring the amount of extension of the shock absorber (for example the H-dimension). The determining of the at least one parameter may include measuring (including inferring from other measurements) the weight of the aircraft supported by the shock absorber. It is preferred that the determining of the at least one parameter gives sufficient data from which it can be judged whether the shock absorber needs servicing. It is preferred that the determining of the at least one parameter gives sufficient data from which it can be judged whether the shock absorber needs a different amount of gas—and preferably the amount that needs adding (or the pressure difference that needs to be achieved). It is preferred that the determining of the at least one parameter gives sufficient data from which it can be judged whether the shock absorber needs a different amount of hydraulic fluid—and preferably the amount that needs adding (whether by mass, volume or other indication).

In certain embodiments, the at least one parameter is measured after a suspected hard-landing of the aircraft to which the shock absorber is attached. A hard-landing may cause atypical levels of agitation and/or absorption of Nitrogen into the fluid, as well as causing a spike in the pressure parameter of the gas measured by the gas pressure sensor (if fitted within the shock absorber). The method may be of particular use, after such a hard-landing, to get a more accurate overview of the state of shock absorber, taking into account what may be a large amount of Nitrogen being held within the fluid.

The method of determining at least one parameter at an aircraft shock absorber may include taking measurements of characteristics of the shock absorber at a first time when the aircraft shock absorber is in a first state, and at a second time when the aircraft shock absorber is in a second, different state (and optionally at a third or yet further times when the aircraft shock absorber is in a third state and/or further states). For example, one of the first and second states may be when the aircraft shock absorber is fully extended (the extension of the shock absorber then being a known, and well-defined, amount). For example, the aircraft shock absorber may be fully extended during flight. This may allow a comprehensive assessment of the state of the shock absorber to be made during flight, for example by measuring each of gas absorption, pressure and temperature. One of the states may be when the aircraft shock absorber is not fully extended (i.e. fully or partially compressed). One of the first and second states may be when the aircraft has its full weight on wheels. One of the first and second states may be when the shock absorber has reached a state of equilibrium (e.g. the temperature of the fluid in the shock absorber is at ambient, surrounding, temperature and/or the rate of change of absorption of gas in the fluid is zero). One of the first and second states may relate to a state with one or more known parameters, such as for example one or more of (a) a known volume of one or more chambers of the shock absorber, (b) a known weight being supported via the shock absorber, and (c) a known physical extension of the shock absorber. Taking measurements at different times, may allow sufficient data to be extracted in order to make a full (or fuller/better or more comprehensive) assessment of the state of the shock absorber.

According to a third aspect of the present invention there is provided a servicing cart for servicing an aircraft shock absorber, the aircraft shock absorber having at least one chamber containing both hydraulic fluid and a gas in fluid communication with each other, an amount of the gas being absorbed in the hydraulic fluid. The at least one chamber may include a gas port and a fluid port. The servicing cart includes a fluid sampling chamber arranged to receive a sample of the hydraulic fluid from the at least one chamber of the aircraft shock absorber via the fluid port. The servicing cart may include a second sampling chamber arranged to receive a sample of the gas from the at least one chamber of the aircraft shock absorber via the gas port. The servicing cart also has a gas absorption sensor device coupled to the fluid sampling chamber and arranged to measure the amount of the gas absorbed in the sample of the hydraulic fluid for determining a gas absorption parameter. The servicing cart may also include a gas sensor device coupled to the gas sampling chamber and arranged to measure pressure of the sample of the gas for determining a pressure parameter. It may be that the gas absorption parameter, and optionally one or more pressure parameters, are used to provide information to a user of the servicing cart, for example to prompt the aircraft shock absorber to be serviced and/or to assist in the servicing of the aircraft shock absorber.

In certain embodiments, the servicing cart may include a gas reservoir and a hydraulic fluid reservoir. In such a case, it may be that a gas port and a fluid port are arranged to provide gas from the gas reservoir and hydraulic fluid from the fluid reservoir, respectively, to replenish gas and hydraulic fluid in the at least one chamber of the aircraft shock absorber.

Since the level of Nitrogen gas absorbed in the hydraulic fluid of a shock absorber will affect the ride-height and therefore the H-dimension, the provision of a parameter indicating this level of absorption may be used either on its own or in combination with other parameters to adjust minimum serviceability criteria for aircraft shock absorbers, particularly but not exclusively in relation to the H-dimension minimum measurement. An advantage of embodiments of the present invention described above is therefore that the provision of the above-mentioned parameters may prevent unnecessary maintenance actions from being taken, or that less invasive maintenance actions may be employed.

There is also provided an aircraft landing gear shock absorber comprising a sensor device of the present invention as described or claimed herein. Such a sensor device may for example be configured to provide a measurement of the amount of gas in the hydraulic fluid in the shock absorber for use by an aircraft system, for example an aircraft system which provides information to the pilot/flight crew regarding the state of the landing gear and/or a ground maintenance system for example a landing gear servicing cart. A memory may be provided, for example as part of the sensor device, in which to store previous measurements in order to detect changes in the state of the shock absorber over time in order to predict future maintenance actions. There is also provided an aircraft including an aircraft landing gear shock absorber comprising a sensor device of the present invention as described or claimed herein. There is also provided an aircraft configured to perform the method of the present invention as described or claimed herein.

It will of course be appreciated that features described in relation to one embodiment of the invention may be incorporated into other embodiment of the invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

FIGS. 1 and 2 show an aircraft landing gear of a type suitable for use with all of the illustrated embodiments of the present invention. FIG. 1 shows an aircraft 101 comprising a pair of wings 106 and a fuselage 105. The aircraft is supported on the ground by sets of landing gear assemblies comprising a main landing gear (MLG) 108 and a nose landing gear (NLG) 110. Each landing gear assembly is provided with suspension and shock absorption functions, by means of a shock absorber assembly 102. The shock absorber 102 is of a type where hydraulic fluid is in fluid contact with Nitrogen such that some Nitrogen may be absorbed by the fluid.

After landing, when the aircraft 101 has come to a rest, the amount of Nitrogen absorbed or otherwise contained in the hydraulic fluid within the shock absorber 102 will be a complex function of the aircraft 101 weight (and thus shock absorber 102 pressure), the surrounding temperature and the extent to which the Nitrogen and fluid have been mixed during landing and taxiing. Thus the H-dimension of the shock absorber 102 is variable with both service condition and aircraft activity and using the H-dimension to indicate the mass of gas may lead to an inaccurate estimate of the mass of gas in the shock absorber 102, which may result in an unnecessary or incorrect servicing action taking place. It will be understood that the following arrangements, which take into account the amount of Nitrogen absorption in the Hydraulic fluid, facilitate an improved determination of the maintenance state of a shock absorber 102 of the aircraft 101 in a weight-on-wheels state.

Figure 4:
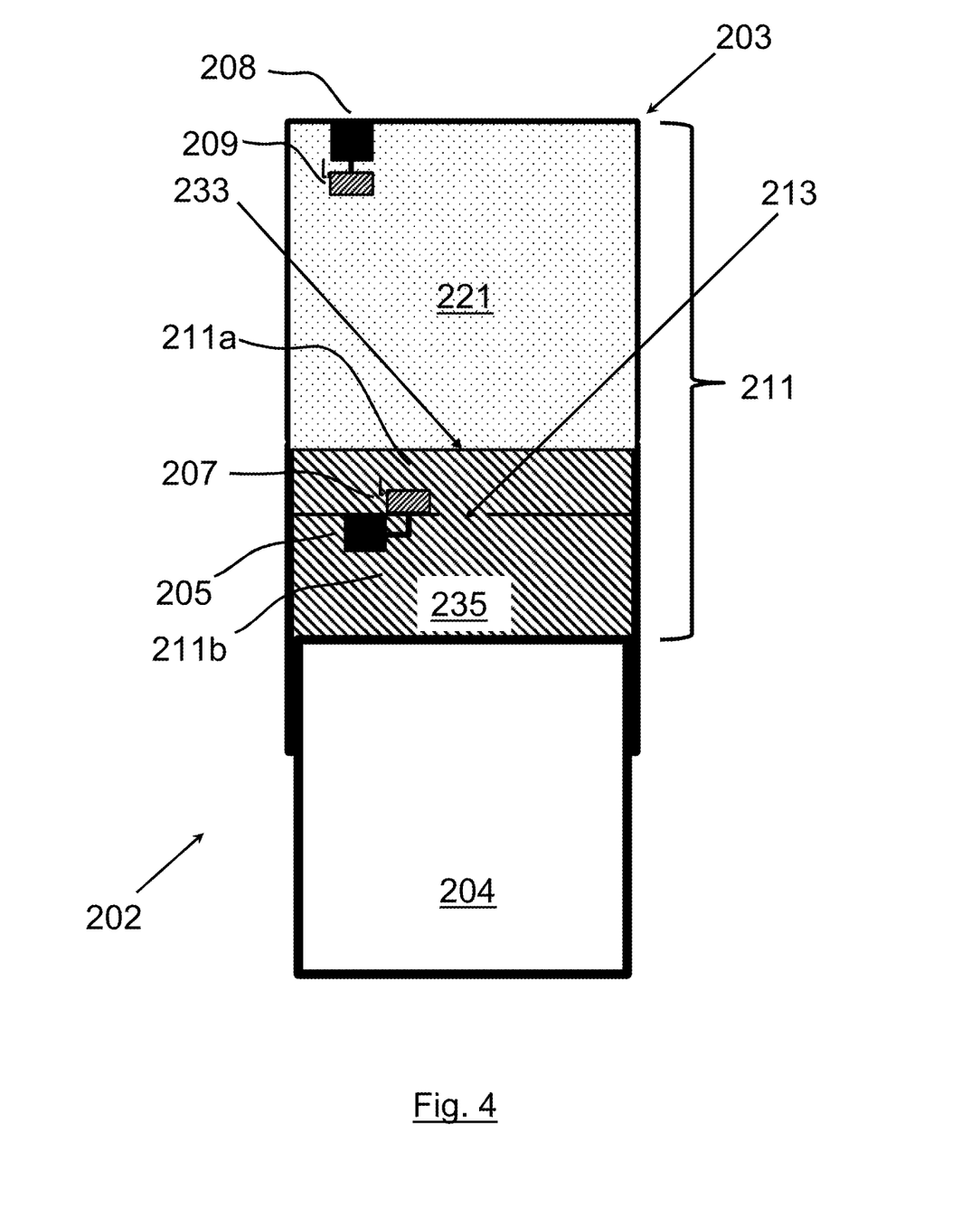
FIG. 4 shows a two-stage shock absorber incorporating a sensor according to a first embodiment of the invention.

According to a first embodiment of the invention, a gas absorption sensor is integrated with the aircraft landing gear shock absorber. Such a shock absorber 202 is shown in FIG. 4, and has a lower part (piston 204) arranged to slide within an upper part (cylinder 203) so that the shock absorber 202 is telescopic. The cylinder 203 incorporates a chamber 211 of variable volume in which hydraulic fluid 235 and Nitrogen gas 221 are in fluid communication with each other, so that there is at least one surface 233 of contact between the fluid 235 and gas 221. The chamber 211 is split into two separate compartments 211a, 211b divided by a restrictive opening 213 arranged to provide resistance for fluid flow between the compartments 211a, 211b.

A gas absorption sensor 205 is mounted within the structure of the chamber 211 in such a way that it is in contact with the hydraulic fluid 235, preferably by being mounted below the restrictive opening 213. The gas absorption sensor 205 may be a total dissolved gas (TDG) sensor, of a type which uses a pressure transducer behind a rigid gas-permeable membrane to measure absorption levels of gases dissolved (absorbed) in a fluid. The gas absorption sensor 205 therefore provides a gas absorption parameter representative of the level of Nitrogen gas absorbed in the hydraulic fluid 235, and is thus a sensor which directly measures the amount of the gas absorbed locally in the hydraulic fluid (as opposed to making measurements regarding global temperature, gas pressure, and/or volume in order to calculate or infer the total amount of gas that might be absorbed in all of the fluid, and therefore indirectly calculate/infer a gas absorption parameter). The gas absorption sensor 205 is operably coupled to a communications interface 207 located within the chamber 211 of shock absorber 202 and which may be a wired or wireless connection such as a near-field communication (NFC) connection. The communications interface 207 is arranged to receive the gas absorption parameter from the gas absorption sensor 205 and to provide the same over a suitable communications medium. A suitable antenna (not shown) may be required to enable the communications interface 207 to communicate wirelessly with the communications medium. Alternatively, wired connections (not shown) provide connectivity to other systems (not shown) of the aircraft 101.

The gas in the chamber 211 acts as a gas spring thus providing part of the suspension function of the shock absorber 202. Damping is provided as a result of the hydraulic fluid 235 being forced through the restrictive opening 213 as the piston 204 slides within the cylinder 203.

The shock-absorber 102 may also contain a gas pressure sensor 208, located at the top of the compartment 211a of the chamber 211, such that in operation it measures the pressure (gas pressure parameter) of the Nitrogen gas 121 occupying the topmost portion of the compartment 211a of the chamber 211. In an alternative arrangement (not shown) the gas pressure sensor 208 may be co-located with the gas absorption sensor 205 within the hydraulic fluid 235 below the restrictive opening 213. The gas pressure sensor 208 may be operably coupled to the communications interface 207, or to a further communications interface 209 located within the chamber 211 of shock absorber 202 as shown in FIG. 4. The further communications interface 209 may be a wired or wireless connection such as a near-field communication (NFC) connection. The communications interface 209 is arranged to receive the gas pressure parameter from the gas pressure sensor 208 and to provide the same over a suitable communications medium.

It will be appreciated that the gas pressure sensor 208 may alternatively be incorporated in a combined gas pressure and temperature sensor (not shown) in order to also obtain a gas temperature parameter of the Nitrogen gas 121. Similarly a discrete gas temperature sensor (not shown) could be provided at substantially the same location as the gas pressure sensor 208, in order to provide the gas temperature parameter.

In operation the gas absorption sensor 205, (and optionally, the gas pressure sensor 208) is connected to other systems and sub-systems of the aircraft 101 via the communications interface 207, such that the parameter indicating the amount of Nitrogen gas absorbed in the hydraulic fluid 211 (and optionally, the gas pressure parameter and/or gas temperature parameter) is provided when other systems of the aircraft 101 are active. The parameter(s) may be provided in a continuous or periodic manner. For example when other aircraft systems are in operation, if one or more parameters such as the gas absorption parameter exceed a certain threshold, an alert message or similar may be provided to alert the flight crew and/or maintenance support function, indicating a spike in gas pressure and/or a high-level of absorbed gas in the hydraulic fluid. This could be useful immediately after a hard-landing (since such an event is known to increase the amount of Nitrogen gas absorbed in the hydraulic fluid 211 and to cause a spike in the pressure parameter measured by the gas pressure sensor 208) so as to alert the flight crew to potentially degraded shock-absorber performance along with a warning to perform ground manoeuvers such as taxiing, turning and braking with extra care.

Alternatively a number of periodic measurements may be taken over time and stored as historic flight and/or ground telemetry, such that trend analysis may be performed on the resulting telemetry during scheduled maintenance or at set intervals.

Alternatively, the communications interface 207 may be arranged to provide a wireless signal such that a maintenance crewmember or other user may obtain the parameter via a suitable wireless device such as a near-field communications device. Alternatively a physical connection (not shown) may be provided between the communications interface 207 and an outer surface of the shock absorber 202, such that a user may obtain the above-mentioned parameter directly via the physical connection.

It will also be appreciated that by providing the gas absorption sensor 205 (and optionally the gas pressure sensor 208 and/or combined gas pressure and temperature sensor) within the shock absorber, a first reading of the gas absorption parameter (and optionally the gas pressure and/or temperature parameter) may be taken when the aircraft 101 is in flight with the landing gear 108, 110 extended (when the h-dimension parameter will be at a known maximum displacement). Therefore the state of the aircraft shock absorber 102 may be determined in flight.

After landing, a second reading of the gas absorption parameter 205 may be taken with the aircraft 101 in a 'weight-on-wheels' state (where a further h-dimension may be measured). The change in shock 'stroke' between the two h-dimension parameters, gives a known change in the volume of the chamber 211, and this may be used to determine the expected gas pressure change, and from the two readings of the parameters the state of the shock absorber may be more fully ascertained.

Figure 5:
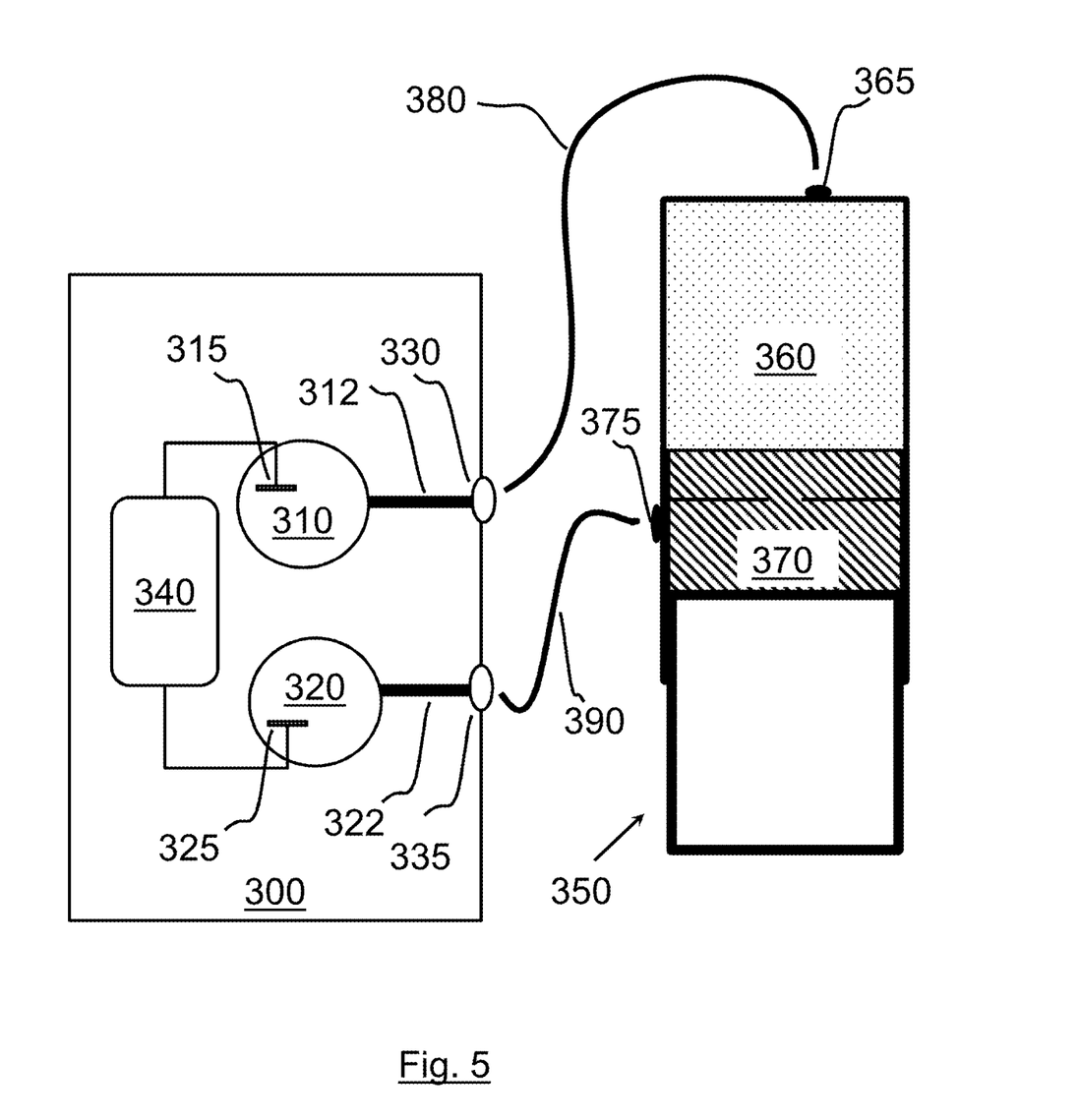
FIG. 5 shows an aircraft shock absorber and an apparatus incorporating a sensor according to a second embodiment of the invention.

According to a further embodiment of the invention the gas absorption sensor may be provided separately from the landing gear. With reference to FIG. 5, a sampling apparatus 300 is shown. The sampling apparatus 300 includes a gas chamber 310 containing a combined gas temperature and pressure sensor 315, and a pipe 312 connected to a gas inlet 330 for receiving a gas sample therefrom. The sampling apparatus also includes a hydraulic fluid chamber 320 containing a gas absorption sensor 325 and a pipe 322 connected to a hydraulic fluid inlet 335 for receiving hydraulic fluid sample therefrom. The gas absorption sensor 325 is of a similar type to the gas absorption sensor 205 of FIG. 4, such that it is arranged to provide an indication of the level of absorption of Nitrogen gas in the hydraulic fluid sample provided at the hydraulic fluid chamber 320.

A control module 340 is coupled receive signals from the combined gas temperature and pressure sensor 315 and the gas absorption sensor 325 to allow operator interaction as further described below. The control unit 340 comprises a computer processor, which is programmed with computer software held in memory readable by the computer processor and which, when executed, cause the control unit 340 to function as required by the present embodiment. There is also data held in memory accessible by the control unit 340, such data may include parameter limits, previous measurements, algorithms and other suitable data.

In use, the sampling apparatus 300 is coupled to an aircraft shock absorber 350, having an internal chamber in which Nitrogen gas 360 and hydraulic fluid 370 are in fluid communication with each other. The shock absorber 350 includes a gas port 365 suitable for providing a sample of the gas 360, and a hydraulic fluid port 375 suitable for providing a sample of the hydraulic fluid 370, such that samples of the gas 360 and the hydraulic fluid 370 may be obtained via their respective ports 365 and 375. A single-stage shock absorber is represented diagrammatically in FIG. 5; it will be appreciated that the foregoing description applies equally to two-stage shock absorbers; in the present case, it will be understood that the gas 360 referred to above is the gas in an upper chamber which is in fluid contact with the hydraulic fluid (211b of FIG. 4), rather than the gas in a lower chamber (not shown).

A gas hose 380 is provided for coupling the gas inlet 330 of the sampling apparatus 300 to the gas port 365 of the shock absorber 350. Similarly a hydraulic fluid hose 390 is provided for coupling the hydraulic fluid inlet 335 of the sampling apparatus 300 to the hydraulic fluid sampling port 370 of the shock absorber 350.

In use, the sampling apparatus 300 is connected to the shock absorber 350 by means of the gas sampling pipe 380 and a hydraulic fluid sampling pipe 390.

A sample of the gas 360 is provided at the gas chamber 310 via the gas port 365, the gas hose 380, the gas inlet 330 and the gas pipe 312. The temperature and pressure of the sample of the gas 360 is measured by the gas sensor 315 and temperature and pressure parameters derived therefrom are provided to the control unit 340.

Similarly a sample of the hydraulic fluid 370 is provided at the hydraulic fluid chamber 320 via the hydraulic fluid port 375, the hydraulic fluid hose 390, the hydraulic fluid inlet 335 and the hydraulic fluid pipe 322. The absorption level representing the amount of Nitrogen absorbed in the sample of the hydraulic fluid 370 is measured by gas absorption sensor 325 and a gas absorption parameter derived therefrom is provided to the control unit 340. It will also be appreciated that the sample of the hydraulic fluid taken from port 375 as could also be used for measuring the pressure and temperature parameters, as the fluid and gas pressures and temperatures will be substantially the same in a steady state.

The control unit 340 may provide the gas temperature and pressure parameters and the gas absorption parameter to a user via a suitable interface, either via a display screen (not shown) or via transmission to a smart device via wired or wireless connection. Furthermore the control unit 340 may store the gas temperature and pressure parameters and the gas absorption parameter along with other data entered by a user, such as timestamp information, aircraft/shock absorber serial number, a 'H-dimension' value of the shock-absorber, and user information.

In a further embodiment the gas absorption sensor may be provided as part of a portable probe. Thus, referring now also to FIG. 6, the sampling apparatus 300 of FIG. 5 may be replaced with a portable device 305 to which a gas absorption sensor probe 395 and a combined temperature and pressure probe 397 are attached. The gas absorption sensor probe 395 is similar to the gas sensor 325 of FIG. 5, but is arranged as a probe which is adapted to communicate directly with the hydraulic fluid port 375. Similarly the combined temperature and pressure probe 397 is similar to the gas temperature and pressure sensor 315 of FIG. 5, but is arranged as a probe which is adapted to communicate directly with the gas port 365. It will also be appreciated that the combined temperature and pressure probe 397 could also be arranged to communicate directly with the hydraulic fluid port 375, such that the temperature and pressure parameters may be obtained therefrom, as the fluid and gas pressures and temperatures will be substantially the same in a steady state.

Figure 6:
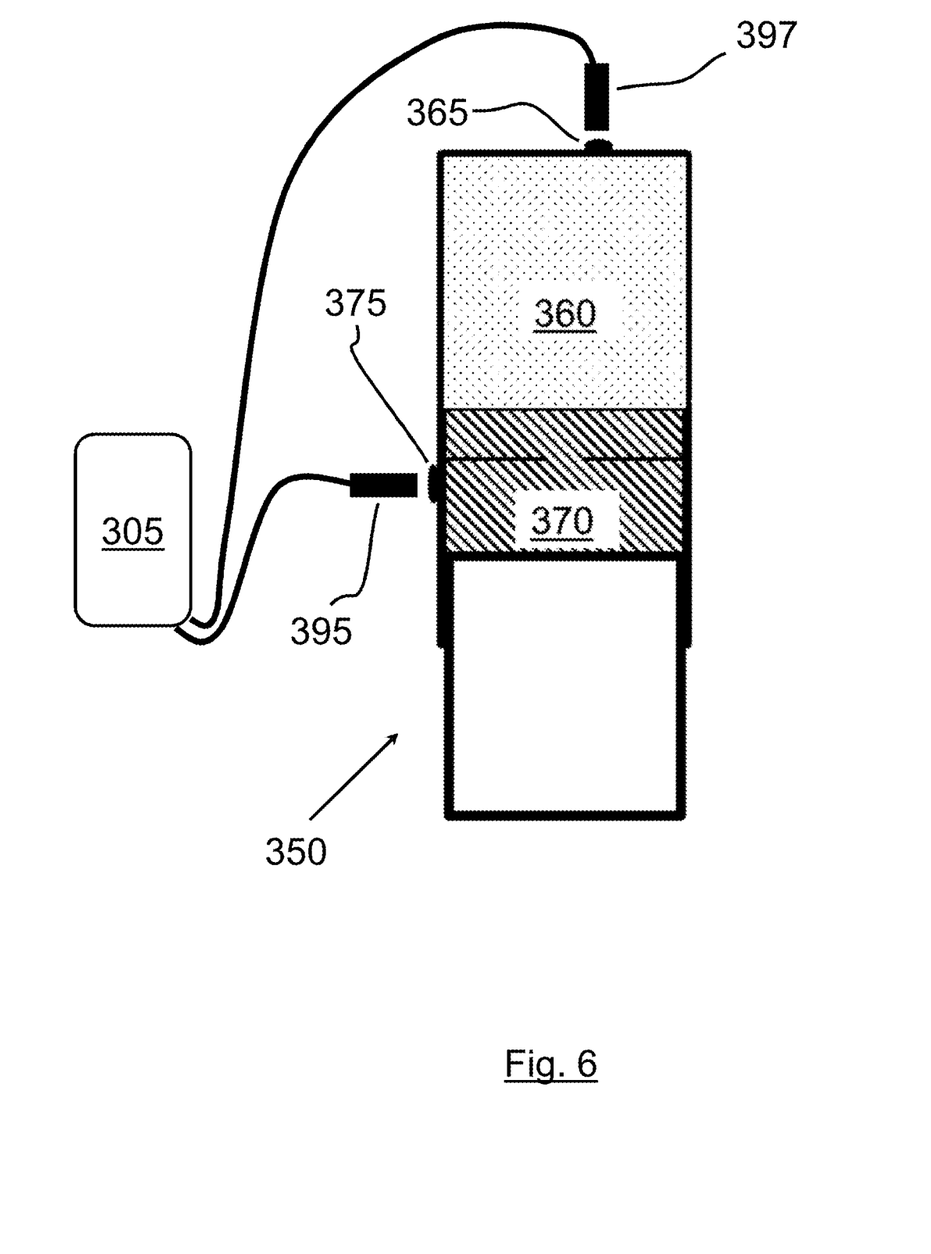
FIG. 6 shows an aircraft shock absorber and an apparatus incorporating a sensor according to a further embodiment of the invention.

In this way the gas temperature and pressure parameters of the gas 360 and the gas absorption level parameter of the hydraulic fluid 370 are measured directly at the aircraft shock absorber 350 and provided to the portable device 305, which may be a smartphone or tablet device. Such arrangements may improve the accuracy of the respective measurements, as the states of the gas 360 and hydraulic fluid 370 within the shock absorber 350 would be more accurately sampled in situ. It will be appreciated that other arrangements are possible, in which, for example, the gas absorption sensor probe 395 and the temperature and pressure probe 397 may be discrete devices incorporating a power supply and transmission means such that their respective parameters are provided wirelessly to the portable device 305, the control unit 340 of FIG. 5, or at another terminal located some distance away from the shock absorber 350, such as a server at an aircraft maintenance facility (not shown).

It will be appreciated that the combined gas temperature and pressure sensor 315 and combined gas temperature and pressure probe 397 may be replaced by discrete sensors and probes respectively. Additionally the temperature parameter may be obtained by measuring ambient temperature, or by receiving meteorological information at the location of the aircraft 101, and the gas pressure may be inferred from the aircraft weight and centre-of-gravity stated values.

Figure 7:
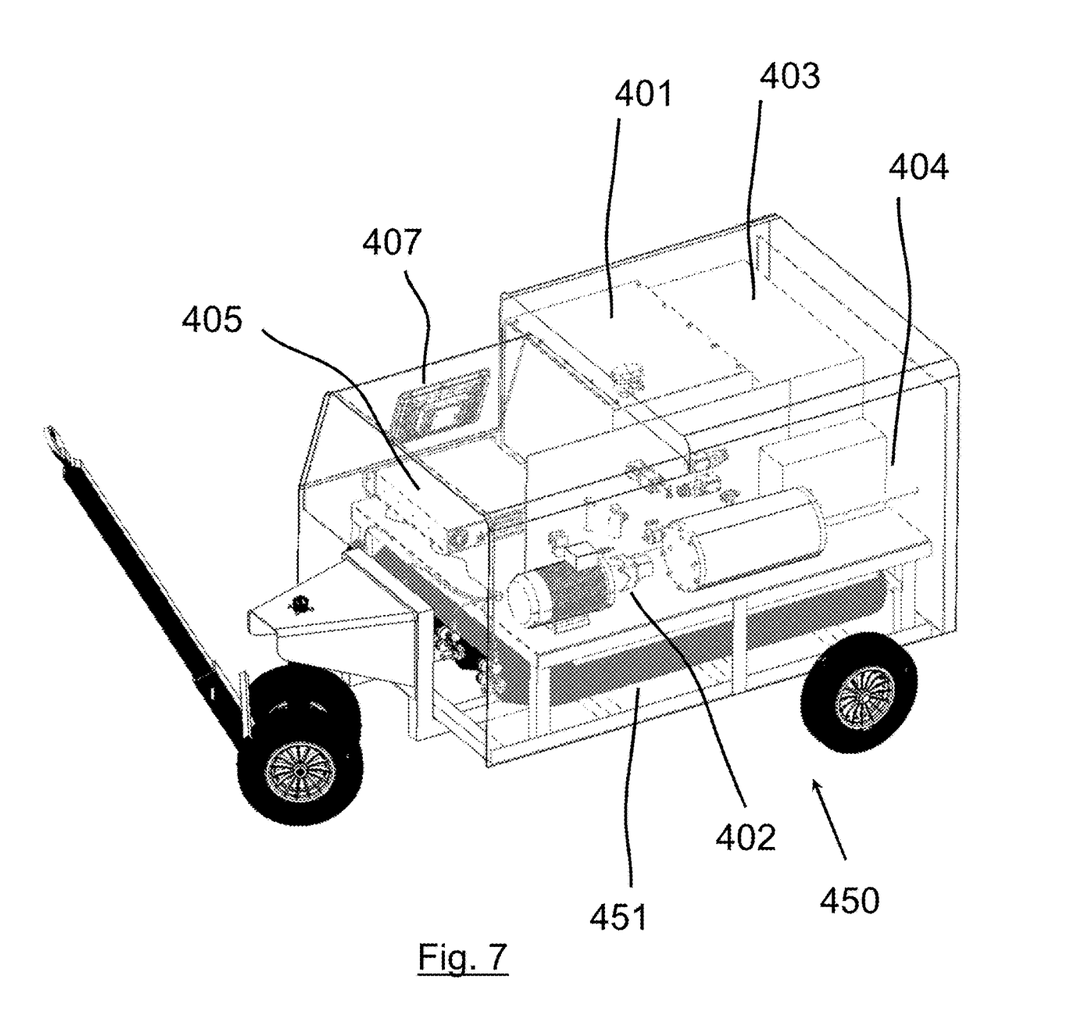
FIG. 7 show a portable servicing cart incorporating the apparatus of FIG. 5 or FIG. 6 according to a further embodiment of the invention.

In a further embodiment, the sampling apparatus 300 may be incorporated into a servicing cart for an aircraft shock absorber as shown in FIG. 7. The cart 450 provides an integrated set of servicing equipment that can replenish hydraulic fluid and inject gas into the shock absorber 102. The cart 450 includes a reservoir 401 of hydraulic fluid and pressurised canisters 451 of Nitrogen gas. A fluid delivery system 402 of the cart 450 is coupled to the reservoir 401, and a gas delivery system 403 and a gas boost pump 404 are coupled to the canisters 451. The hydraulic fluid delivery system 402, gas delivery system 403, and the various sensors are connected to a control unit 405, which is itself connected to a human interface unit 407. In this case, the human interface unit 407 is in the form of a touch sensitive display screen. The control system 405 of the cart 450 controls the servicing process in response to inputs from the human interface unit 407.

It will be readily apparent that the control unit 340 of FIG. 5 may be incorporated in the control system 405 of FIG. 7. Furthermore the gas delivery system 403 and boost pump 404 may be connected to a gas manifold (not shown) of the cart 450, which incorporates the gas chamber 310 and gas temperature and pressure sensor 315 of FIG. 5. Similarly the fluid delivery system 402 may be connected to a fluid manifold (not shown) of the cart 450, which incorporates the fluid chamber 320 and gas absorption sensor 325 of FIG. 5.

Furthermore the gas inlet 320 and hydraulic fluid inlet 330 of the sampling apparatus 350 may be incorporated in bidirectional gas and hydraulic fluid ports (not shown) respectively of the servicing cart 450. In this way the servicing cart may supply Nitrogen gas to the gas port 365 of the of the shock absorber 350, and hydraulic fluid to the hydraulic port 375 of the shock absorber 350. The servicing cart 450 may therefore, under the control of a user or an automatic process, determine at least some of the gas temperature, pressure and gas absorption parameters and, based on either user input or an automated process utilising a suitable algorithm, provide subsequent replenishment of Nitrogen gas and/or hydraulic fluid to the shock absorber 350 in dependence upon the above parameters, as part of an integrated sampling and servicing regime.

Figure 8:
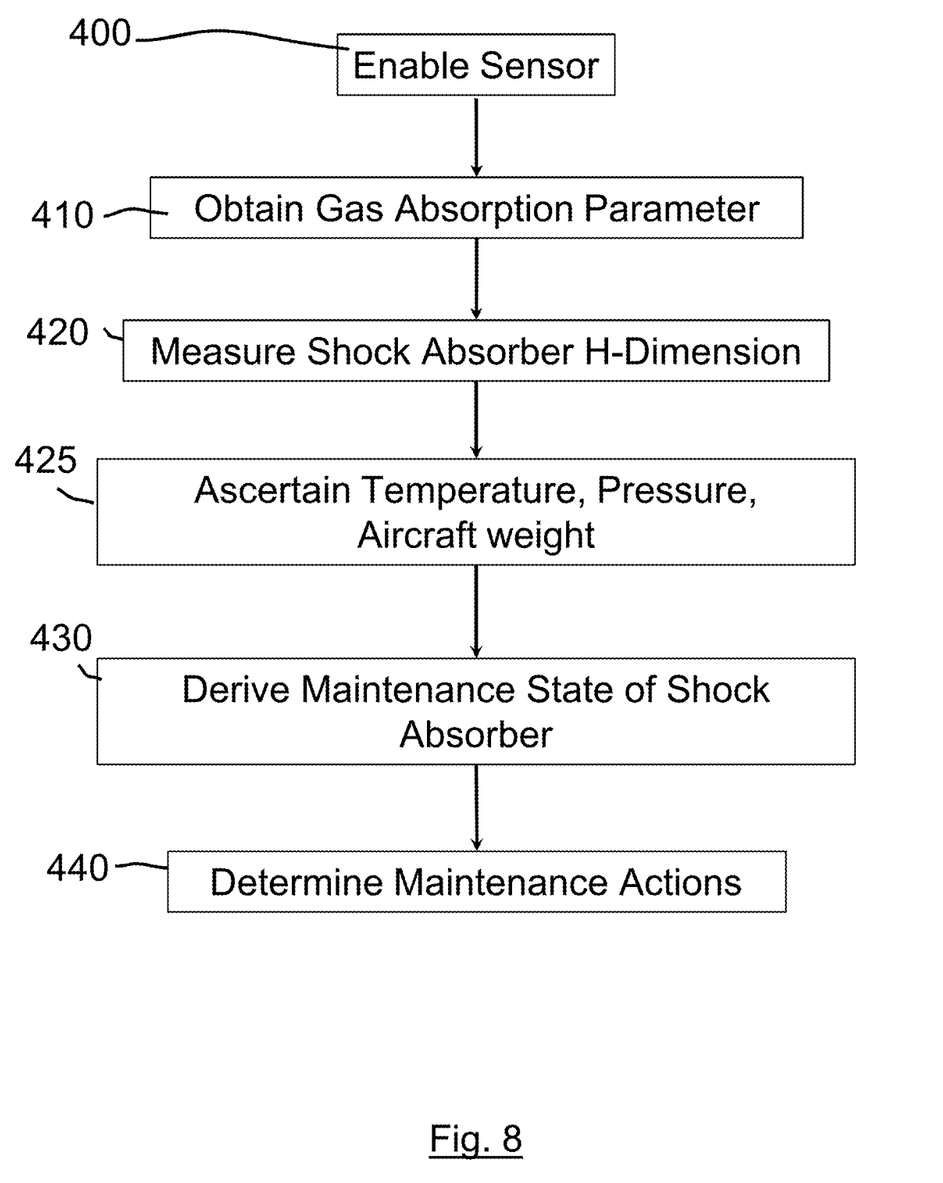
FIG. 8 is a flow-chart illustrating an example servicing process carried out in accordance with any one of the embodiments of the invention.

With reference now also to FIG. 8, a method is shown for determining one or more parameters of the state of an aircraft shock absorber on a landing gear assembly of an aircraft, together with a determination of any maintenance actions that may be required at the shock absorber.

At step 400, the method includes a first step to initialise/activate the gas absorption sensor. This could be directly in the case of turning on the sensor 207 incorporated within the shock absorber 204 of FIG. 4, via connection of the hydraulic hose 390 between the sampling apparatus 300 and the shock absorber 350 of FIG. 5, or by other means.

At step 410 the amount of gas absorbed in the hydraulic fluid is determined by measuring a gas absorption level of the hydraulic fluid. This step of the method includes deriving a gas absorption parameter.

At step 420, the method includes measuring the H-dimension of the shock absorber (as shown in FIG. 3).

Optionally, at step 425, the method includes the determination by measurement or otherwise of at least one of the following: ambient temperature, gas temperature, gas pressure, and/or aircraft weight and centre-of-gravity details.

At step 430, the method includes deriving the maintenance state of the shock absorber. This may be performed manually by comparing the H-dimension measured value with that expected from a lookup table which incorporates compensation factors based on different values of the gas absorption parameter, and optionally, the gas temperature and pressure parameters described above. The lookup table may use either ambient temperature, or the gas temperature parameter. Similarly the lookup table may use either a pressure inference based on aircraft weight or the gas pressure parameter. Alternatively the maintenance state may be derived by a suitable computer programme executed by the control unit 340 of FIG. 5, the control unit 405 of FIG. 7 or by some other suitable means under the control of a user. The computer programme performs an algorithm based on the following inputs: the measured H-dimension, the gas absorption parameter, inferred pressure based on aircraft weight or the gas pressure parameter and the ambient temperature or the gas temperature parameter. The result of the algorithm is an output indicating the maintenance state of the shock absorber.

At step 440, the method includes determining any maintenance actions required at the shock absorber. By way of example, taking into account the amount of Nitrogen absorbed in the hydraulic fluid 370, a user such as a maintenance engineer is able to determine whether, for a given H-dimension and known gas temperature, pressure and gas absorption parameters, the shock absorber 350 is in a serviceable or unserviceable state, and whether the addition of further Nitrogen (gas) and/or hydraulic fluid to the chamber 355 of the shock absorber 350 is required.

In addition to the state of the shock absorber (202, 350) above being assessed as serviceable or unserviceable, deviations in the properties of the Nitrogen gas (221, 360) and the hydraulic fluid (235, 370) over time may be recorded and used predictively in order to adjust planned maintenance actions, or place weight limitations for the aircraft 101 until the next maintenance event.

Knowing more information about the internal state of the shock absorber may also assist with the analysis of events such as hard landings. The combination of all three parameters (pressure, temperature and gas absorption level of the hydraulic fluid) allows a more comprehensive assessment of the service state of the gear to be ascertained. As described above this could be monitored continuously or at required intervals.

Furthermore, measuring the pressure of the nitrogen gas (221, 360) in the shock absorber (202. 350) may provide an independent verification of aircraft weight and centre-of-gravity parameters, which may, for example, be useful when the aircraft 101 is loaded close to weight or centre-of-gravity limits.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The apparatus may be arranged to service a single type of shock absorber or a plurality of different shock absorbers that may include single or multiple stage shock absorbers. Furthermore the apparatus may be arranged to service both nose landing gear and main landing gear of aircraft where these have different shock absorber arrangements.

It will be understood by those skilled in the art that the processing functionality of the apparatus that embodies a part or all of the presently described embodiments of the invention (for example the control unit described herein) may be a general purpose device having software arranged to provide a part or all of such functionality. The device could be a single device or a group of devices and the software could be a single program or a set of programs. Furthermore, any or all of the software used to implement the invention can be communicated via any suitable transmission or storage means so that the software can be loaded onto one or more devices.

The gas absorption sensor may provide a measure only of the gas dissolved in the hydraulic fluid. The gas absorption sensor may provide a measure not only of the gas dissolved in the hydraulic fluid, but also an indication of the amount of gas in the hydraulic fluid in the form of bubbles of gas. The gas absorption sensor may provide an indication of the total gas in the hydraulic fluid, whether dissolved or otherwise. It will thus be understood that the sensor device may be arranged to measure an absorption level of the amount of the gas in the hydraulic fluid as a measure of the amount of the gas dissolved in the hydraulic fluid (e.g. not including any bubbles of gas that may exist in the fluid) or the sensor device may be arranged to provide a measure of the amount of the gas contained in the hydraulic fluid (e.g. whether dissolved or as bubbles).

There may be application of embodiments of the invention in relation to making measurements of the amount of the gas absorbed in the hydraulic fluid during, or immediately after a hard-landing (including a hard overweight landing). For example, such an application may be in the form of a method of operating an aircraft including a step of landing the aircraft, deeming the landing to be a hard-landing (e.g. by objective measures and/or by the pilot or flight crew deeming the landing to be a hard-landing), providing data concerning the state of an aircraft landing gear assembly as part of a hard-landing report including data relating to, or derived from, a measure of the absorption of gas in hydraulic fluid in a shock absorber of the aircraft landing gear as measured by a sensor device as described or claimed herein. It may be that one or more measurements from a pressure sensor in the shock absorber are used in deeming whether there has been a hard-landing.

There may be application of embodiments of the invention in relation to making measurements of the amount of the gas absorbed in the hydraulic fluid as part of a method of predicting when (additional/further) maintenance might be appropriate. For example, such an application may be in the form of a method of operating an aircraft including assessing the state of an aircraft landing gear assembly with the use of multiple measurements of parameters relating to the aircraft landing gear assembly taken over time, the parameters measured including successive measurements of the amount of absorption of gas in hydraulic fluid in a shock absorber of the aircraft landing gear as measured by a sensor device as described or claimed herein. Such a method many include detecting a deviation in the state of the aircraft landing gear assembly as so measured compared with one or more historical states. Such a method many include predicting when further maintenance and/or manual inspection of the landing gear should be required.

There may be yet other applications in relation to making measurements of the amount of the gas absorbed in the hydraulic fluid as part of a method of other aspects of the operation of an aircraft. For example, such a method may include operating the aircraft, measuring the amount of absorption of gas in hydraulic fluid in a shock absorber of an aircraft landing gear assembly of the aircraft with the use of a sensor device as described or claimed herein, and then using that measurement (or successive measurements over time) to provide information regarding the aircraft. Such information may, for example, include information regarding weight limitations for the aircraft (e.g. until the shock absorber can be properly serviced) and/or the actual weight of the aircraft. Such information may, for example, include information regarding the weight distribution and/or centre of gravity of the aircraft.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The term 'or' shall be interpreted as 'and/or' unless the context requires otherwise.

The invention claimed is:

1. A sensor device for determining at least one parameter at an aircraft shock absorber, the aircraft shock absorber having at least one chamber containing both hydraulic fluid and a gas in fluid communication with each other, an amount of the gas being absorbed in the hydraulic fluid,
  wherein the at least one chamber comprises first and second compartments separated by a restrictive opening, wherein;
  the sensor device comprises a total dissolved gas sensor, wherein the total dissolved gas sensor is disposed in the second compartment containing hydraulic fluid,
  wherein the total dissolved gas sensor directly contacts the hydraulic fluid and is configured to directly measure an absorption level of the amount of the gas absorbed in the hydraulic fluid in order to determine the at least one parameter.

2. The sensor device of claim 1, wherein the sensor device is mounted within the at least one chamber of the shock absorber.

3. The sensor device of claim 1, wherein the at least one parameter is arranged to be monitored by at least one system of an aircraft to which the shock absorber is attached.

4. The sensor device of claim 1, wherein the sensor device is further arranged to measure a pressure of the at least one chamber; the at least one parameter including a pressure parameter.

5. The sensor device of claim 1, wherein the total dissolved gas sensor comprises a pressure transducer behind a rigid gas-permeable membrane.

6. The sensor device of claim 1, wherein the sensor device is mounted within a servicing apparatus operably connected to at least one port of the shock absorber, and wherein the sensor device is arranged to be in contact with the hydraulic fluid via the at least one port in order to determine the at least one parameter.

7. The sensor device of claim 6, wherein the servicing apparatus comprises at least one probe containing the sensor device, wherein the at least one probe is engaged with the at least one port in order to determine the at least one parameter.

8. The sensor device of claim 6, wherein the at least one parameter includes a pressure parameter; and wherein,
the servicing apparatus and/or the sensor device is arranged to determine the pressure parameter via a port of the shock absorber.

9. The sensor device of claim 6, wherein the sensor device is mounted within a first sampling chamber of the servicing apparatus;
the servicing apparatus is further arranged to receive a sample of the hydraulic fluid from the shock absorber into the first sampling chamber via the at least one port; and,
the sensor device is arranged to be in contact with the hydraulic fluid at the first sampling chamber in order to determine the at least one parameter.

10. The sensor device of claim 9, wherein the sensor device is further arranged to measure a pressure of the gas and/or hydraulic fluid;
the at least one parameter includes a pressure parameter;
the servicing apparatus includes a second sampling chamber operably connected to the gas port, and wherein,
the servicing apparatus is further arranged to receive a sample of the gas from the shock absorber into the second sampling chamber via the gas port in order to determine the pressure parameter.

11. The sensor device of claim 9, wherein the servicing apparatus is a landing gear shock absorber servicing cart.

12. An aircraft landing gear shock absorber comprising a sensor device according to claim 1, the sensor device being configured to provide a measurement of the amount of gas in the hydraulic fluid in the shock absorber for use by an aircraft system and/or ground maintenance system.

13. An aircraft landing gear assembly comprising a landing gear shock absorber according to claim 12.

14. An aircraft comprising an aircraft landing gear shock absorber according to claim 12.

15. A method of determining at least one parameter at an aircraft shock absorber, comprising:
providing the sensor device of claim 1,
directly measuring an absorption level of the amount of gas absorbed in the hydraulic fluid, and
using the measured absorption level to provide the at least one parameter.

16. The method of claim 15, wherein the at least one parameter further comprises a pressure parameter, and wherein the method further comprises the steps of;
measuring a pressure of a chamber of the shock absorber containing the hydraulic fluid and the gas; and,
deriving therefrom the pressure parameter.

17. The method of claim 15, wherein the at least one parameter provides an indication of a maintenance state of the shock absorber.

18. The method of claim 15, wherein the at least one parameter is used to derive maintenance actions for servicing the aircraft shock absorber.

19. The method of claim 15, wherein the at least one parameter is measured after a suspected hard-landing of the aircraft to which the shock absorber is attached.

20. A servicing cart for servicing an aircraft shock absorber, the aircraft shock absorber having:
at least one chamber containing both hydraulic fluid and a gas in fluid communication with each other, an amount of the gas being absorbed in the hydraulic fluid,
the at least one chamber including a gas port and a fluid port, wherein the at least one chamber comprises first and second compartments separated by a restrictive opening, the servicing cart including:
a fluid sampling chamber arranged to receive a sample of the hydraulic fluid from the at least one chamber of the aircraft shock absorber via the fluid port,
a second sampling chamber arranged to receive a sample of the gas from the at least one chamber of the aircraft shock absorber via the gas port;
a gas absorption sensor device coupled to the fluid sampling chamber and arranged to measure an absorption level of the amount of the gas absorbed in the sample of the hydraulic fluid for determining a gas absorption parameter,
a gas sensor device coupled to the gas sampling chamber and arranged to measure a pressure of the sample of the gas for determining a pressure parameter,
wherein the gas sensor device comprises a total dissolved gas sensor,
wherein the total dissolved gas sensor is disposed in the second compartment containing hydraulic fluid,
wherein the total dissolved gas sensor directly contacts the hydraulic fluid, and
wherein the gas absorption parameter and the pressure parameter are provided to a user of the servicing cart to allow the aircraft shock absorber to be serviced.

21. The servicing cart of claim 20, wherein the servicing cart includes a gas reservoir and a hydraulic fluid reservoir, and wherein;
the gas port is further arranged to provide gas from the gas reservoir to replenish gas in the at least one chamber of the aircraft shock absorber; and
the fluid port is further arranged to provide hydraulic fluid from the fluid reservoir to replenish hydraulic fluid in the at least one chamber of the aircraft shock absorber.

* * * * *